United States Patent
Hao (10) Patent No.: US 10,473,993 B2
(45) Date of Patent: Nov. 12, 2019

(54) PIXEL ELECTRODE AND LIQUID CRYSTAL DISPLAY PANEL

(71) Applicant: Shenzhen China Star Optoelectronics Semiconductor Display Technology Co., Ltd., Shenzhen (CN)

(72) Inventor: Sikun Hao, Shenzhen (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 101 days.

(21) Appl. No.: 15/742,035

(22) PCT Filed: Nov. 15, 2017

(86) PCT No.: PCT/CN2017/111033
§ 371 (c)(1),
(2) Date: Jan. 5, 2018

(87) PCT Pub. No.: WO2019/024322
PCT Pub. Date: Feb. 7, 2019

(65) Prior Publication Data
US 2019/0041705 A1    Feb. 7, 2019

(30) Foreign Application Priority Data
Aug. 3, 2017  (CN) .......................... 2017 1 0657606

(51) Int. Cl.
*G02F 1/1362*  (2006.01)
*G02F 1/1337*  (2006.01)
*G02F 1/1343*  (2006.01)

(52) U.S. Cl.
CPC .... *G02F 1/136286* (2013.01); *G02F 1/13439* (2013.01); *G02F 1/133707* (2013.01);
(Continued)

(58) Field of Classification Search
CPC ......... G02F 1/133707; G02F 1/134327; G02F 1/13439
See application file for complete search history.

(56) References Cited

U.S. PATENT DOCUMENTS

2015/0055069 A1* 2/2015 Cheng ............... G02F 1/133707
                                                    349/123
2016/0139468 A1 5/2016 Kim et al.
2016/0377922 A1* 12/2016 Oh .................... G02F 1/133707
                                                    349/96

FOREIGN PATENT DOCUMENTS

CN   101013239 A   8/2007
CN   103454816 A   12/2013
(Continued)

*Primary Examiner* — Dung T Nguyen
(74) *Attorney, Agent, or Firm* — Leong C. Lei (57) ABSTRACT

The present invention provides a pixel electrode and a liquid crystal display panel. The pixel electrode includes a first enclosure frame (15) that is connected to distal ends of all pixel electrode branches (13) and a trunk (11) and at least a second enclosure frame (17) that is set around an outer circumference of the first enclosure frame (15) and connected to the trunk (11) so that electric fields at edges of the pixel electrode are made regular and uniform by means of the arrangement of the first enclosure frame (15) and the second enclosure frame (17) and thus, liquid crystal molecules located around edges of a sub-pixel could be oriented in a more consistent or more uniform manner, making it possible to eliminate dark patterns at the edges of the sub-pixel and increasing the optical transmission rate of the liquid crystal display panel. Further, a new domain is formed and delimited between the first enclosure frame (15) and the second enclosure frame (17) to thereby further improve view angle at low grey levels of the liquid crystal display panel.

11 Claims, 9 Drawing Sheets

(52) U.S. Cl.
CPC .......... *G02F 1/134327* (2013.01); *G02F 2001/134345* (2013.01); *G02F 2201/123* (2013.01)

(56) References Cited

FOREIGN PATENT DOCUMENTS

| | | |
|---|---|---|
| CN | 104503155 A | 4/2015 |
| CN | 106292084 A | 1/2017 |
| CN | 107329334 A | 11/2017 |

\* cited by examiner

Prior Art

PIXEL ELECTRODE AND LIQUID CRYSTAL DISPLAY PANEL

BACKGROUND OF THE INVENTION

1. Field of the Invention

The present invention relates to the field of display technology, and more particular to a pixel electrode and a liquid crystal display panel.

2. The Related Arts

Active thin-film transistor liquid crystal display (TFT-LCD) panels have been developed rapidly in the recent years and gain wide applications. The TFT-LCD panels that are currently available in the mainstream market are of three classes, which are twisted nematic (TN) or super twisted nematic (STN), in-plane switching (IPS), and vertical alignment (VA), among which VA type LCD panel possesses extremely high contrast, as compared to the other types of LCD panel, and is widely used in large-size displaying, such as liquid crystal televisions.

Figure 1:
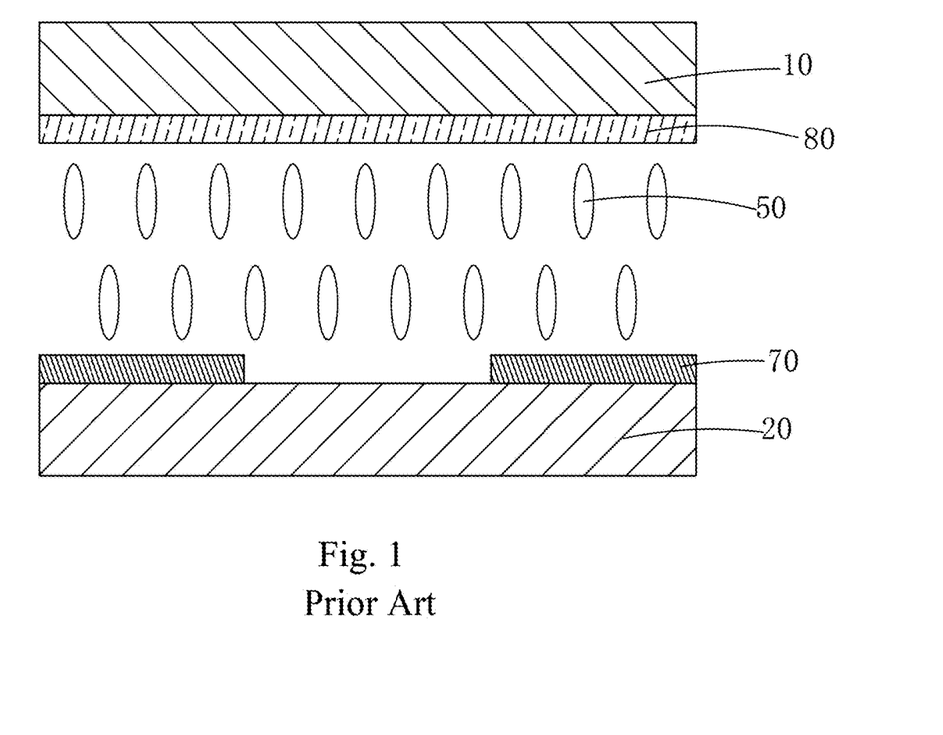
FIG. 1 is a schematic view illustrating a cross-sectional structure of a conventional vertical alignment (VA) type liquid crystal display panel.

As shown in FIG. 1, a conventional VA type LCD panel comprises: an upper substrate 10, a lower substrate 20 that is opposite to the upper substrate 10, a liquid crystal layer 30 interposed between the upper substrate 10 and the lower substrate 20, a pixel electrode 70 provided on the lower substrate 20, and a common electrode 80 provided on the upper substrate 10 and opposite to the pixel electrode 70. The VA type LCD panel involves liquid crystal that rotate vertically and thus, a relatively large difference is present in birefringence of the liquid crystal molecules, which leads to an issue of color shift at a large view angle.

Figure 2:
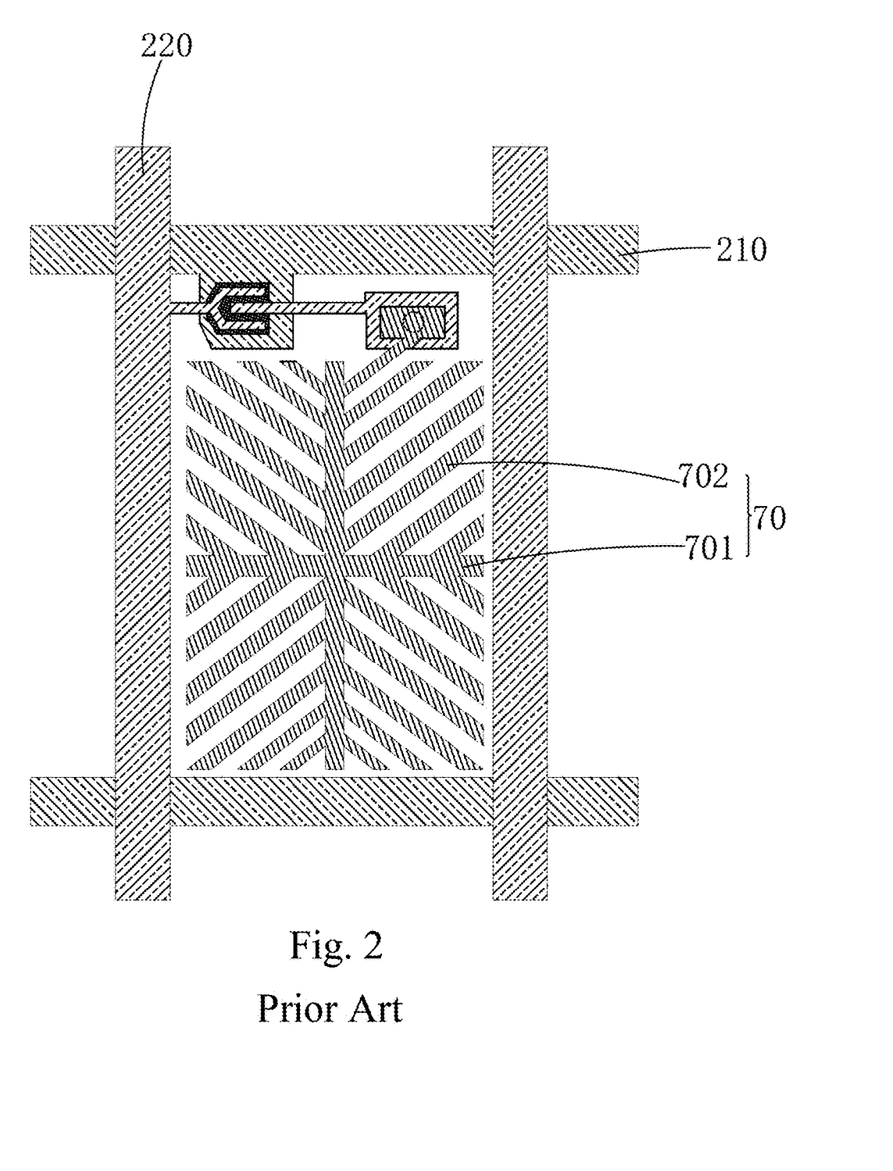
FIG. 2 is a plan view showing one side of a lower substrate of FIG. 1.

To provide the VA LCD panels with better performance in respect of wide view angle and improve the color shift issue, it is common to adopt multi-domain vertical alignment (MVA) techniques, in which a sub-pixel is divided into multiple domains and the liquid crystal contained in the domains are applicable with electrical voltages so as to incline toward different directions whereby viewing from different angles is made consistent and homogeneous. Reference being had to FIGS. 1 and 2, a solution that can be adopted to realize MVA is to make the pixel electrode 70 in a star-like or double-cross pattern that includes two crosses overlapping and angularly shifted by an angle of 45 degrees, while the common electrode 80 is made in the form of a continuous, non-interrupted planar electrode having a uniform thickness. Specifically, as shown in FIG. 2, where reference characters 210 and 220 respectively designate scan lines and data lines, a sub-pixel is divided by the pixel electrode 70 into four domains, wherein the pixel electrode 70 comprises a trunk 701 in a "cross" form and multiple strip likes pixel electrode branches 702 that extend from the "cross" shaped trunk 701 at angles that are respectively 45°, 135°, −135°, and −45° with respect to the horizontal direction. Every two adjacent ones of the strip pixel electrode branches 702 extending in the same direction define therebetween a void slit. Such a star like or double cross pattern of the pixel electrode 70 generates inclining electrical fields that conduct liquid crystal molecules in different ones of the domains to incline or tilt toward different directions, resulting in an improvement on color shifting.

Figure 3:
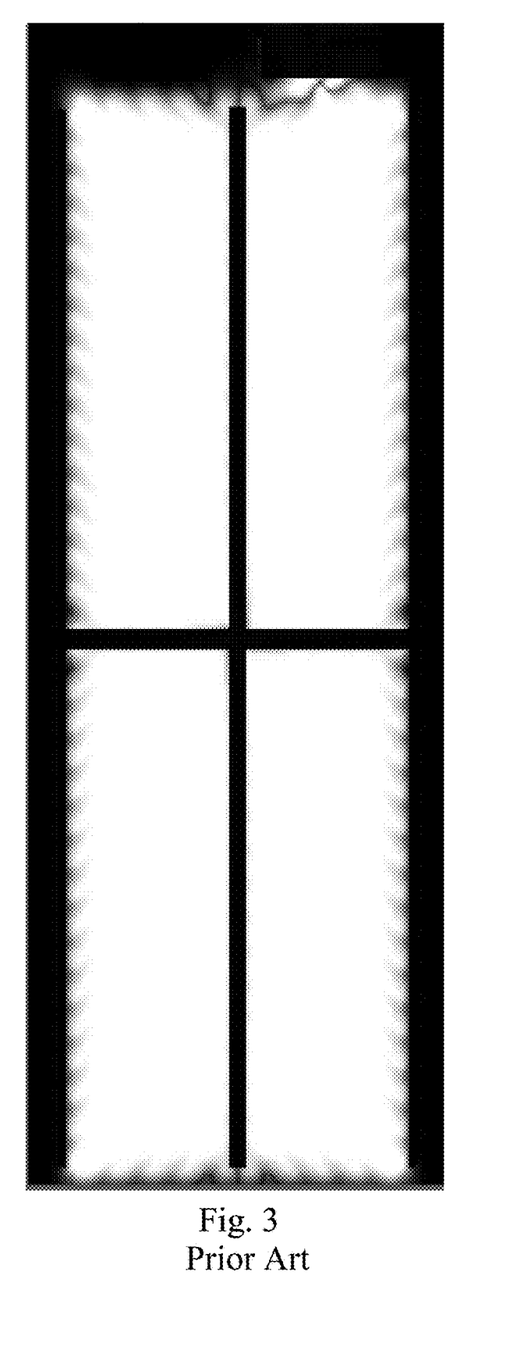
FIG. 3 is a schematic view illustrating optical performance of a sub-pixel that adopts a conventional pixel electrode of a star-like or double-cross pattern.

FIG. 3 illustrates optical performance of a sub-pixel that adopts the above-described pixel electrode 70 having a star like or double cross pattern. Since the four peripheral edges of the pixel electrode 70 are generally irregular, the direction of the electrical field established at the edges are random, making the direction of the liquid crystal molecules around the edges of the sub-pixel inconsistent and thus affecting light transmission. Edge areas of the sub-pixel may exhibit dark patterns, causing deterioration of displaying quality.

SUMMARY OF THE INVENTION

An objective of the present invention is to provide a pixel electrode, which helps eliminate dark pattern occurring at peripheral edges of a sub-pixel, increases optical transmission rate of a liquid crystal display panel, and also improves view angles of the liquid crystal display panel.

Another objective of the present invention is to provide a liquid crystal display panel, of which a sub-pixel is free of dark pattern at peripheral edges thereof, has an increased optical transmission rate, and may further improve view angle.

To achieve the above objectives, the present invention provides a pixel electrode, which comprises:

a trunk, which divides a sub-pixel into multiple domains;

a plurality of pixel electrode branches, which extend from the trunk in different directions in different ones of the domains, wherein each of the domains comprises multiple ones of the pixel electrode branches that are substantially parallel to and spaced from each other and the pixel electrode branches of two adjacent ones of the domains extend in different directions;

a first enclosure frame that is connected to a distal end of each of the pixel electrode branches and the trunk; and at least one second enclosure frame that is arranged around an outer circumference of the first enclosure frame and connected to the trunk;

wherein the first enclosure frame and the second enclosure frame have shapes that are similar and spaced from each other so as to define and delimit an additional domain therebetween.

In the pixel electrode, the trunk is made in a "cross" shape and the "cross" shaped trunk divide the sub-pixel into four domains.

In the pixel electrode, the pixel electrode branches in the domains extend in directions that are at angles of 45°, 135°, −135°, and −45° with respect to a horizontal direction.

In the pixel electrode, the shapes of the first enclosure frame and the second enclosure frame are rectangles and the two rectangles form an arrangement comprising two rectangular loops fit over each other.

In the pixel electrode, the pixel electrode is formed of a material comprises indium tin oxide (ITO).

The present invention also provides a liquid crystal display panel, which comprises an upper substrate, a lower substrate that is arranged opposite to the upper substrate, a common electrode that is provided on a side of the upper substrate that faces the lower substrate, a pixel electrode that is provided on a side of the lower substrate that faces the upper substrate, and a liquid crystal layer that is interposed between the common electrode and the pixel electrode;

wherein the pixel electrode comprises:

a trunk, which divides a sub-pixel into multiple domains;

a plurality of pixel electrode branches, which extend from the trunk in different directions in different ones of the domains, wherein each of the domains comprises multiple ones of the pixel electrode branches that are substantially parallel to and spaced from each other and the pixel electrode branches of two adjacent ones of the domains extend in different directions;

a first enclosure frame that is connected to a distal end of each of the pixel electrode branches and the trunk; and at least one second enclosure frame that is arranged around an outer circumference of the first enclosure frame and connected to the trunk;

wherein the first enclosure frame and the second enclosure frame have shapes that are similar and spaced from each other so as to define and delimit an additional domain therebetween.

In the liquid crystal display panel, the trunk is made in a "cross" shape and the "cross" shaped trunk divide the sub-pixel into four domains.

In the liquid crystal display panel, the pixel electrode branches in the domains extend in directions that are at angles of 45°, 135°, −135°, and −45° with respect to a horizontal direction.

In the liquid crystal display panel, the shapes of the first enclosure frame and the second enclosure frame are rectangles and the two rectangles form an arrangement comprising two rectangular loops fit over each other.

In the liquid crystal display panel, the pixel electrode is formed of a material comprises ITO.

The present invention further provides a pixel electrode, which comprises:

a trunk, which divides a sub-pixel into multiple domains;

a plurality of pixel electrode branches, which extend from the trunk in different directions in different ones of the domains, wherein each of the domains comprises multiple ones of the pixel electrode branches that are substantially parallel to and spaced from each other and the pixel electrode branches of two adjacent ones of the domains extend in different directions;

a first enclosure frame that is connected to a distal end of each of the pixel electrode branches and the trunk; and at least one second enclosure frame that is arranged around an outer circumference of the first enclosure frame and connected to the trunk;

wherein the first enclosure frame and the second enclosure frame have shapes that are similar and spaced from each other so as to define and delimit an additional domain therebetween;

wherein the trunk is made in a "cross" shape and the "cross" shaped trunk divide the sub-pixel into four domains;

wherein the pixel electrode branches in the domains extend in directions that are at angles of 45°, 135°, −135°, and −45° with respect to a horizontal direction;

wherein the shapes of the first enclosure frame and the second enclosure frame are rectangles and the two rectangles form an arrangement comprising two rectangular loops fit over each other; and wherein the pixel electrode is formed of a material comprises ITO.

The efficacy of the present invention is that the present invention provides a pixel electrode, which comprises a first enclosure frame that is connected to distal ends of all pixel electrode branches and a trunk and at least a second enclosure frame that is set around an outer circumference of the first enclosure frame and connected to the trunk so that electric fields at edges of the pixel electrode are made regular and uniform by means of the arrangement of the first enclosure frame and the second enclosure frame and thus, liquid crystal molecules located around edges of a sub-pixel could be oriented in a more consistent or more uniform manner, making it possible to eliminate dark patterns at the edges of the sub-pixel and increasing the optical transmission rate of the liquid crystal display panel. Further, a new domain is formed and delimited between the first enclosure frame and the second enclosure frame to thereby further improve view angle at low grey levels of the liquid crystal display panel. The present invention provides a liquid crystal display panel, which comprises the above-described pixel electrode, so that the liquid crystal display panel suffers no dark patterns at edges of a sub-pixel inside contained therein to show increased optical transmission rate and making further improvement on view angles at lower grey levels.

BRIEF DESCRIPTION OF THE DRAWINGS

For better understanding of the features and technical contents of the present invention, reference will be made to the following detailed description of the present invention and the attached drawings. However, the drawings are provided only for reference and illustration and are not intended to limit the present invention.

In the drawings.

DETAILED DESCRIPTION OF THE PREFERRED EMBODIMENTS

To further expound the technical solution adopted in the present invention and the advantages thereof, a detailed description will be given with reference to the preferred embodiments of the present invention and the drawings thereof.

Figure 4:
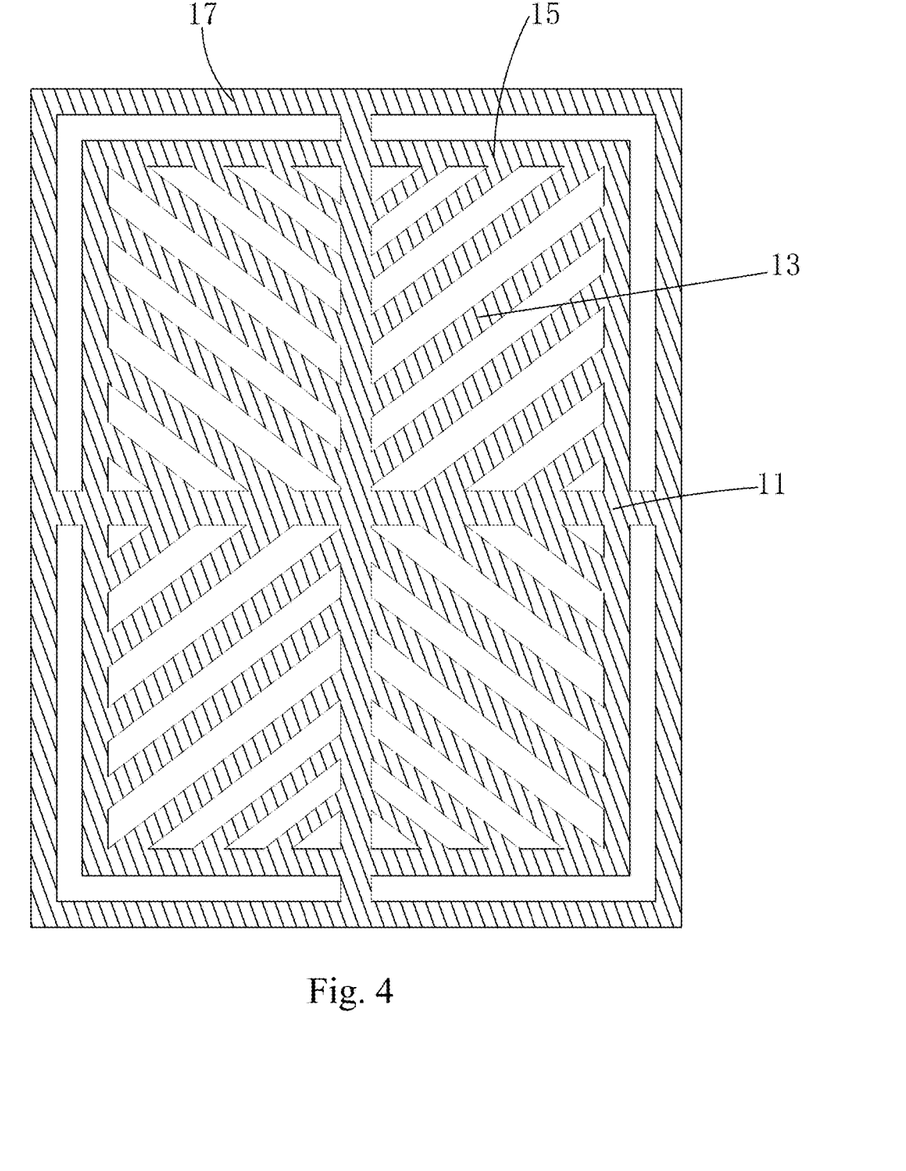
FIG. 4 is a top plan view showing a pixel electrode according to the present invention.

Referring to FIG. 4, firstly, the present invention provides a pixel electrode, which comprises: a trunk 11, a plurality of pixel electrode branches 13, a first enclosure frame 15, and at least one second enclosure frame 17.

The trunk 11 divides a sub-pixel into multiple domains. Generally, the trunk 11 is structured in a "cross" formed and the "cross" shaped trunk 11 divides a sub-pixel into four domains. It is certain that the trunk 11 can be of other shapes that divide a sub-pixel into more domains.

The plurality of pixel electrode branches 13 are extended from the trunk 11 in different directions in different ones of the domains. The plurality of pixel electrode branches 13 are substantially parallel to and spaced from each other in each of the domains, and the pixel electrode branches 13 of two adjacent ones of the domains are extended in different directions. Preferably, the pixel electrode branches 13 are each in the form of a slender strip and the pixel electrode branches 13 of each of the domains are made to extend in a direction at an angle of 45°, 135°, −135°, and −45° with respect to a horizontal direction. The plurality of pixel electrode branches 13 and the trunk 11 collectively form a star-like or double-cross pattern.

The first enclosure frame 15 is connected to a distal end of each of the pixel electrode branches 13 (which is the end of the pixel electrode branch 13 that is distant from the trunk 11) and the trunk 11.

The second enclosure frame 17 is arranged around an outer circumference of the first enclosure frame 15 and is connected to the trunk 11.

Specifically, the first enclosure frame 15 and the second enclosure frame 17 have shapes that are similar and are spaced from each other. Preferably, the shapes of the first enclosure frame 15 and the second enclosure frame 17 are both rectangles and they form an arrangement comprising two rectangular loops fit over each other.

Specifically, the pixel electrode of the present invention is made of a material that is preferably indium tin oxide (ITO).

Figure 5:
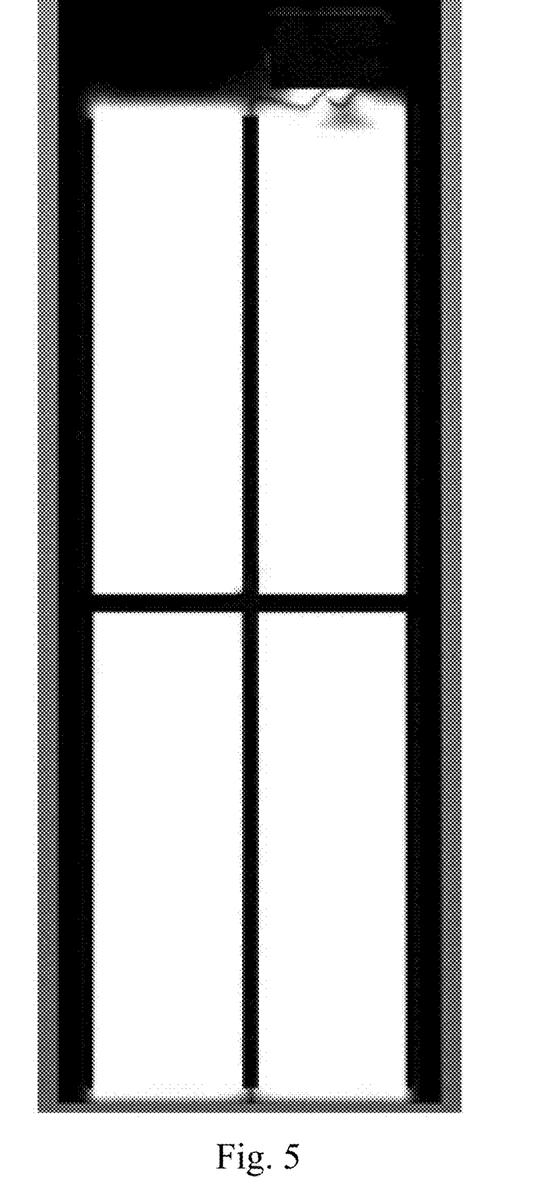
FIG. 5 is a schematic view illustrating optical performance of a sub-pixel that involves the pixel electrode according to the present invention.
Figure 7:
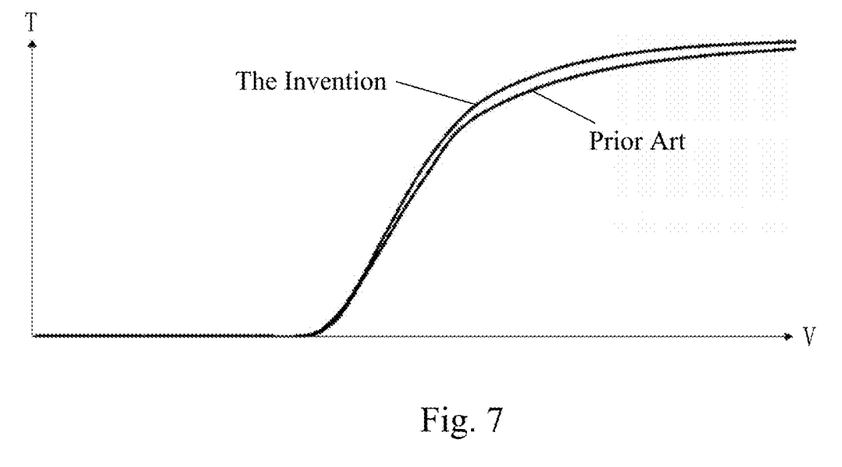

The first enclosure frame 15 and the second enclosure frame 17 both have a regular shape so that peripheral edges of the pixel electrode are made regular and flat and thus, an electric field established at the edges of the pixel electrode is made regular, allowing liquid crystal molecules located around the edges of the sub-pixel to orient consistently and uniformly, whereby, as shown in FIG. 5, dark patterns at the peripheral edges of the sub-pixel are prevented. FIG. 7 provides a plot of a V-T curve of transmission rate of a liquid crystal display panel adopting the pixel electrode according to the present invention and that of a liquid crystal display panel adopting a conventional pixel electrode for comparison, wherein the abscissa axis indicates voltage (V) and the ordinate axis indicates transmission rate (T). It can be learnt from FIG. 7 that the liquid crystal display panel that adopts the pixel electrode according to the present invention possesses an increased transmission rate.

Figure 6:
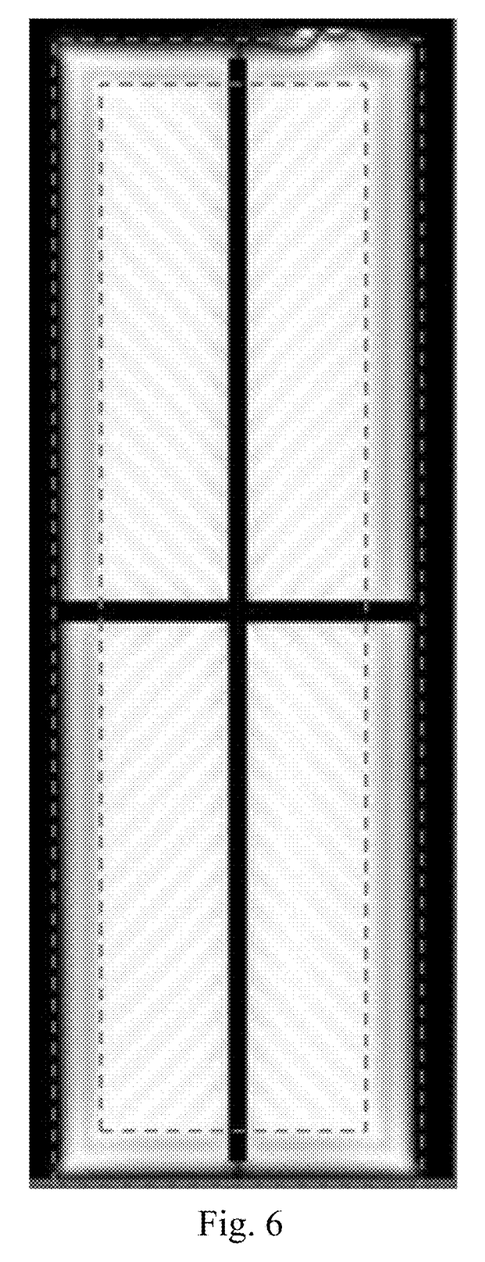
FIG. 6 is a schematic view illustrating a new domain formed between a first enclosure frame and a second enclosure frame of the pixel electrode according to the present invention FIG. 7 provides a plot of a curve of transmission rate of a liquid crystal display panel adopting the pixel electrode according to the present invention and that of a liquid crystal display panel adopting a conventional pixel electrode for comparison.

Further, reference is made to FIGS. 4 and 6, wherein the first enclosure frame 15 and the second enclosure frame 17 collectively define a new domain therebetween (which is the area delimited between two phantom line frames in FIG. 6). In the new domain, the liquid crystal molecules would be provided with a directional angle that is different those of the liquid crystal molecules in other domains so that the view angles of the liquid crystal display panel at low grey levels can be improved.

Figure 8:
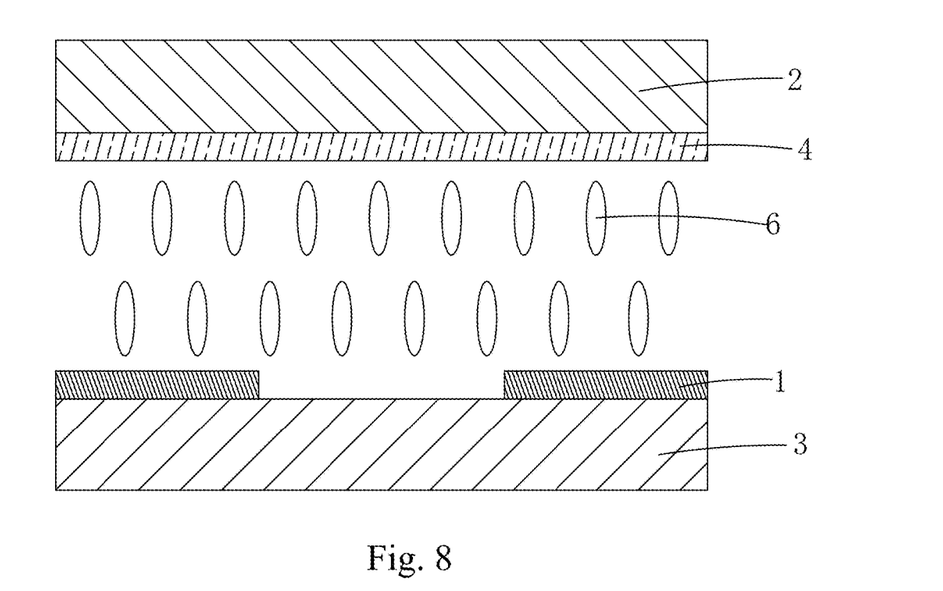
FIG. 8 is a schematic view showing a cross-sectional structure of a liquid crystal display panel according to the present invention.
Figure 9:
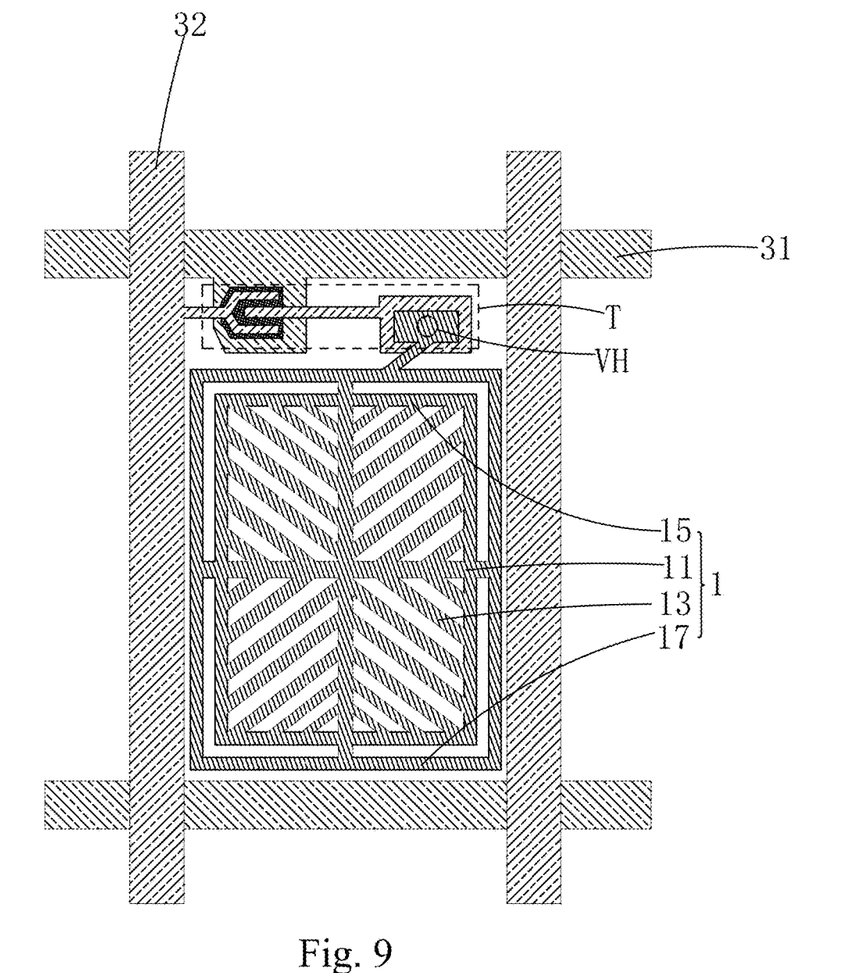
FIG. 9 is a plan view illustrating one side of a lower substrate of FIG. 8.

Based on the same inventive concept, with reference to FIGS. 8 and 9, the present invention also provides a liquid crystal display panel, which comprises: an upper substrate 2, a lower substrate 3 that is arranged opposite to the upper substrate 2, a common electrode 4 provided on one side of the upper substrate 2 that faces the lower substrate 3, a pixel electrode 1 provided on one side of the lower substrate 3 that faces the upper substrate 2, and a liquid crystal layer 6 interposed between the common electrode 4 and the pixel electrode 1.

The pixel electrode 1 can be the above-described pixel electrode shown in FIG. 4 that helps eliminate dark patterns on the peripheral edges of a sub-pixel, increases the transmission rate of the liquid crystal display panel, and improves view angle at low grey levels of the liquid crystal display panel. Repeated description of the pixel electrode 1 will be omitted herein.

Specifically, as shown in FIG. 9, the lower substrate 3 is provided with gate lines 31 extending in a horizontal direction, data lines 32 extending in a vertical direction, and a TFT T, wherein the TFT T has a gate connected to the gate lines 31 and a source connected to the data lines 32. Further, the gate lines 31 and the gate of the TFT T both belong to a first metal layer; and the data lines 32, the source of the TFT T, and a drain of the TFT T belong to a second metal layer. The pixel electrode 1 is connected, through a via VII, to the drain of the TFT T.

In summary, the present invention provides a pixel electrode, which comprises a first enclosure frame that is connected to distal ends of all pixel electrode branches and a trunk and at least a second enclosure frame that is set around an outer circumference of the first enclosure frame and connected to the trunk so that electric fields at edges of the pixel electrode are made regular and uniform by means of the arrangement of the first enclosure frame and the second enclosure frame and thus, liquid crystal molecules located around edges of a sub-pixel could be oriented in a more consistent or more uniform manner, making it possible to eliminate dark patterns at the edges of the sub-pixel and increasing the optical transmission rate of the liquid crystal display panel. Further, a new domain is formed and delimited between the first enclosure frame and the second enclosure frame to thereby further improve view angle at low grey levels of the liquid crystal display panel. The present invention provides a liquid crystal display panel, which comprises the above-described pixel electrode, so that the liquid crystal display panel suffers no dark patterns at edges of a sub-pixel inside contained therein to show increased optical transmission rate and making further improvement on view angles at lower grey levels.

Based on the description given above, those having ordinary skills in the art may easily contemplate various changes and modifications of the technical solution and the technical ideas of the present invention. All these changes and modifications are considered belonging to the protection scope of the present invention as defined in the appended claims.

What is claimed is:

1. A pixel electrode, comprising:
    a trunk, which divides a sub-pixel into multiple domains;
    a plurality of pixel electrode branches, which extend from the trunk in different directions in different ones of the domains, wherein each of the domains comprises multiple ones of the pixel electrode branches that are substantially parallel to and spaced from each other and the pixel electrode branches of two adjacent ones of the domains extend in different directions;
    a first enclosure frame that is connected to a distal end of each of the pixel electrode branches and the trunk; and
    at least one second enclosure frame that is arranged around an outer circumference of the first enclosure frame and connected to the trunk;
    wherein the first enclosure frame and the second enclosure frame have shapes that are similar and spaced from each other so as to define and delimit an additional domain therebetween.

2. The pixel electrode as claimed in claim 1, wherein the trunk is made in a "cross" shape and the "cross" shaped trunk divide the sub-pixel into four domains.

3. The pixel electrode as claimed in claim 2, wherein the pixel electrode branches in the domains extend in directions that are at angles of 45°, 135°, −135°, and −45° with respect to a horizontal direction.

4. The pixel electrode as claimed in claim 1, wherein the shapes of the first enclosure frame and the second enclosure frame are rectangles and the two rectangles form an arrangement comprising two rectangular loops fit over each other.

5. The pixel electrode as claimed in claim 1, wherein the pixel electrode is formed of a material comprises indium tin oxide (ITO).

6. A liquid crystal display panel, comprising an upper substrate, a lower substrate that is arranged opposite to the upper substrate, a common electrode that is provided on a side of the upper substrate that faces the lower substrate, a pixel electrode that is provided on a side of the lower substrate that faces the upper substrate, and a liquid crystal layer that is interposed between the common electrode and the pixel electrode;
wherein the pixel electrode comprises:
a trunk, which divides a sub-pixel into multiple domains;
a plurality of pixel electrode branches, which extend from the trunk in different directions in different ones of the domains, wherein each of the domains comprises multiple ones of the pixel electrode branches that are substantially parallel to and spaced from each other and the pixel electrode branches of two adjacent ones of the domains extend in different directions;
a first enclosure frame that is connected to a distal end of each of the pixel electrode branches and the trunk; and
at least one second enclosure frame that is arranged around an outer circumference of the first enclosure frame and connected to the trunk;
wherein the first enclosure frame and the second enclosure frame have shapes that are similar and spaced from each other so as to define and delimit an additional domain therebetween.

7. The liquid crystal display panel as claimed in claim 6, wherein the trunk is made in a "cross" shape and the "cross" shaped trunk divide the sub-pixel into four domains.

8. The liquid crystal display panel as claimed in claim 7, wherein the pixel electrode branches in the domains extend in directions that are at angles of 45°, 135°, −135°, and −45° with respect to a horizontal direction.

9. The liquid crystal display panel as claimed in claim 6, wherein the shapes of the first enclosure frame and the second enclosure frame are rectangles and the two rectangles form an arrangement comprising two rectangular loops fit over each other.

10. The liquid crystal display panel as claimed in claim 6, wherein the pixel electrode is formed of a material comprises indium tin oxide (ITO).

11. A pixel electrode, comprising:
a trunk, which divides a sub-pixel into multiple domains;
a plurality of pixel electrode branches, which extend from the trunk in different directions in different ones of the domains, wherein each of the domains comprises multiple ones of the pixel electrode branches that are substantially parallel to and spaced from each other and the pixel electrode branches of two adjacent ones of the domains extend in different directions;
a first enclosure frame that is connected to a distal end of each of the pixel electrode branches and the trunk; and
at least one second enclosure frame that is arranged around an outer circumference of the first enclosure frame and connected to the trunk;
wherein the first enclosure frame and the second enclosure frame have shapes that are similar and spaced from each other so as to define and delimit an additional domain therebetween;
wherein the trunk is made in a "cross" shape and the "cross" shaped trunk divide the sub-pixel into four domains;
wherein the pixel electrode branches in the domains extend in directions that are at angles of 45°, 135°, −135°, and −45° with respect to a horizontal direction;
wherein the shapes of the first enclosure frame and the second enclosure frame are rectangles and the two rectangles form an arrangement comprising two rectangular loops fit over each other; and
wherein the pixel electrode is formed of a material comprises indium tin oxide (ITO).

* * * * *